United States Patent [19]
Yamashita et al.

[11] Patent Number: 4,762,383
[45] Date of Patent: Aug. 9, 1988

[54] TWO DIMENSIONAL LIGHT BEAM DEFLECTORS UTILIZING THERMOOPTICAL EFFECT AND METHOD OF USING SAME

[75] Inventors: Tsukasa Yamashita, Nara; Masaharu Matano, Kyoto; Kazuhiko Mori, Osaka; Nobuhisa Inoue, Kyoto, all of Japan

[73] Assignee: Omron Tateisi Electronics Co., Kyoto, Japan

[21] Appl. No.: 818,915

[22] Filed: Jan. 15, 1986

Related U.S. Application Data

[63] Continuation of Ser. No. 445,757, Dec. 1, 1982, abandoned.

[30] Foreign Application Priority Data

| Dec. 4, 1981 | [JP] | Japan | 56-195458 |
| Jan. 20, 1982 | [JP] | Japan | 57-7311 |
| Jan. 20, 1982 | [JP] | Japan | 57-7312 |
| Jan. 21, 1982 | [JP] | Japan | 57-8031 |
| Jan. 29, 1982 | [JP] | Japan | 57-12678 |
| Feb. 10, 1982 | [JP] | Japan | 57-19958 |

[51] Int. Cl.$^4$ .................. G02B 6/10; G02F 1/03
[52] U.S. Cl. .................. 350/96.13; 350/96.14; 350/356; 350/358; 350/320
[58] Field of Search ............. 350/96.10, 96.11, 96.12, 350/96.13, 96.14, 320, 96.15, 355, 358, 356

[56] References Cited

U.S. PATENT DOCUMENTS

| 3,633,996 | 1/1972 | Lean et al. | 350/358 |
| 3,655,261 | 4/1972 | Chang | 350/96.13 |
| 3,810,688 | 5/1974 | Ballman et al. | 350/96.14 X |
| 3,874,782 | 4/1975 | Schmidt | 350/96.13 |
| 3,904,270 | 9/1975 | Cheo | 350/96.13 |
| 3,923,376 | 12/1975 | Martin | 350/96.14 |
| 3,990,780 | 11/1976 | Dakss | 350/96.12 X |
| 4,000,937 | 1/1977 | Kaminow | 350/96.14 |
| 4,047,795 | 9/1977 | Hughes et al. | 350/96.14 |
| 4,092,060 | 5/1978 | Nunoshita et al. | 350/96.13 |
| 4,185,274 | 1/1980 | Giallorenzi | 350/96.13 X |
| 4,208,091 | 6/1980 | Cheo et al. | 350/96.13 |
| 4,217,036 | 8/1980 | Chang | 350/358 |
| 4,235,603 | 4/1982 | Marom | 350/96.14 X |
| 4,253,060 | 2/1981 | Chen | 350/96.14 X |
| 4,264,125 | 4/1981 | Shibata | 350/96.14 |
| 4,280,755 | 7/1981 | McNaney | 350/358 |
| 4,297,704 | 10/1981 | Marom et al. | 350/96.13 X |
| 4,394,060 | 7/1983 | Verber et al. | 350/96.13 |
| 4,395,702 | 7/1983 | Gottlieb et al. | 350/358 X |
| 4,415,226 | 11/1983 | Verber et al. | 350/96.13 |
| 4,439,016 | 3/1984 | Ogland et al. | 350/96.14 |
| 4,635,082 | 1/1987 | Domoto et al. | 350/96.14 X |
| 4,648,686 | 3/1987 | Segawa | 350/96.13 X |
| 4,648,687 | 3/1987 | Yoshida et al. | 350/96.13 |
| 4,705,346 | 11/1987 | Miyawaki | 350/96.14 |

FOREIGN PATENT DOCUMENTS

| 3025073 | 1/1982 | Fed. Rep. of Germany | 350/96.14 X |
| 3201128 | 8/1982 | Fed. Rep. of Germany | 350/96.13 X |
| 3205868 | 9/1982 | Fed. Rep. of Germany | 350/96.13 X |
| 56-155918 | 12/1981 | Japan | 350/96.14 |
| 821661 | 10/1959 | United Kingdom | 350/358 X |
| 2098347 | 11/1982 | United Kingdom | 350/96.13 X |

OTHER PUBLICATIONS

Haruna et al., "Thermo-Optic Effect . . . Switching", Electronics Letters, 10/29/81, vol. 17, No. 22, pp. 842–844.

(List continued on next page.)

Primary Examiner—William L. Sikes
Assistant Examiner—Brian M. Healy
Attorney, Agent, or Firm—Cushman, Darby & Cushman

[57] ABSTRACT

A two-dimensional light beam deflector for deflecting a light beam by a first deflector in a direction parallel to the plane of a thin film optical waveguide formed on a substrate, and also for deflecting the light beam, already deflected once by said first deflector, in a direction perpendicular to the plane of said thin film optical waveguide by a second deflector.

20 Claims, 9 Drawing Sheets

OTHER PUBLICATIONS

Shah, "Fast Acousto-Optic . . . Modulators", Appl. Phys. Lett., vol. 23, No. 2, 7/73, pp. 75-77.

Hayashi et al., "Programmable Optical . . . Crystal", IEEE Journal of Quantum Electronics, vol. QE-14, No. 11, 11/78, pp. 848-854.

Minakata et al., "Temperature Stabilized . . . Modulation", Rev. of the Elect. Comm. Lab., vol. 26, No. 9-10, Sep.-Oct./78, pp. 1139-1154.

"Electro-Optic Multiplexer for Large-Numerical Aperture, Low-Loss Fibers", Gravel et al, *Optics Letters*, vol. 1, No. 1.

"High-Performance Acousto-Optic Guided-Light Beam Device Using Two Tilting Surface Acoustic Waves", *Applied Physics Letters*, vol. 26, No. 4, pp. 140-142, Feb. 15, 1975, Tasi et al.

"Correlator Based on an Integrated Optical Spatial Light Modulator", *Applied Optics*, vol. 120, No. 9, May 1, 1981, pp. 1626-1629.

"A Frequency Multiplexing Light Source with Monolithically Integrated Distributed-Feedback Diode Lasers" by K. Aiki et al.

TWO DIMENSIONAL LIGHT BEAM DEFLECTORS UTILIZING THERMOOPTICAL EFFECT AND METHOD OF USING SAME

This is a continuation of application Ser. No. 445,757, filed Dec. 1, 1982, which was abandoned upon the filing hereof.

BACKGROUND OF THE INVENTION

The present invention relates to a thin film type two-dimensional light beam deflector capable of two-dimensionally deflecting the guided light beam by utilizing, for example, the acousto-optic effect or thermo-optic effect.

In various kinds of photoelectronics-applied devices such as bar-code reader, laser printer, facsimile, flaw detector and optical memory, the necessity of two-dimensional control of the progressing directions of light beam such as laser light is increasing considerably at present.

For this purpose, the two-dimensional light beam deflector is utilized, but conventionally the two-dimensional light deflection was performed by mechanically displacing part of an optical system, through which a light beam passed, as represented by rotating mirror or vibrating mirror.

However, this kind of light beam deflector requires a moving part, and thus is inferior in speed and reliability and creates problems because of its complicated optical system, such as difficulties in production including the alignment of optical axis, minitarization and cost cutting. Also, the conventional deflector has a problem of large power consumption.

BRIEF SUMMARY OF THE INVENTION

The general object of the present invention is to provide an excellent two-dimensional light beam deflector with high speed, high reliability and easy to produce characteristics, which is able to two-dimensionally control the progressing directions of a light beam by a small solid-thin-film type light deflecting device having no mechanical moving parts.

Another object of the present invention is to provide a two-dimensional light beam deflector with a large deflection range by providing an acute angle to light beam radiation end.

Another object of the present invention is to provide a two-dimentional light beam deflecor capable of performing highly efficient two-dimensional deflection by reducing the loss of the light beam travelling through a thin film optical waveguide to a minimum.

A further object of the present invention is to provide a two-dimensional light beam deflector having uniform characteristics which can be mass-produced by means of the optical integrated circuit technology.

Other and further objects of the present invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE INVENTION

Figure 1:
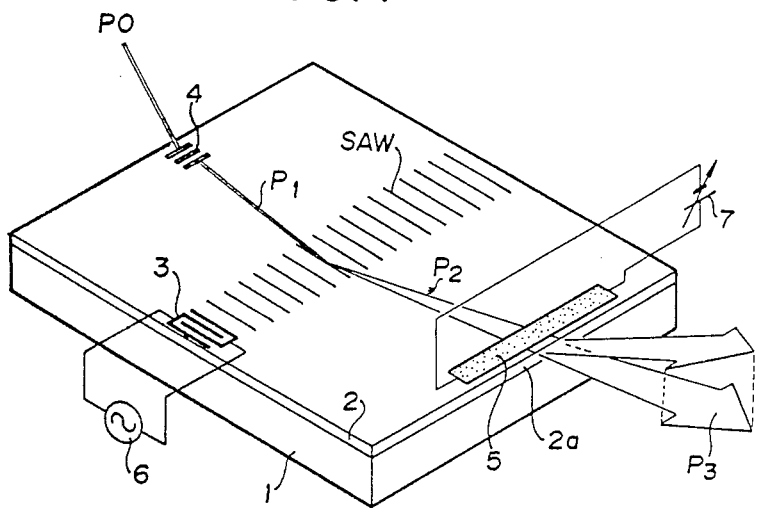
FIG. 1 is a perspective showing the overall construction of the first embodiment of the light beam deflector of the present invention.

In the perspective of FIG. 1 showing the overall construction of a light beam deflector embodying the present invention, the light beam deflector comprises a light-introducing portion which has a thin film waveguide 2 formed on the top surface of a substrate 1, has a comb-shaped electrode 3 (this will be called "IDT: Interdigital transducer" hereinafter) for propagating a surface acoustic wave (SAW) across the thin film optical waveguide 2, and has a gating coupler 4 for propagating a light beam P1 across the thin film optical waveguide 2 in such a manner that a light beam P0 from the outside will have a Bragg angle with the wave surface of said SAW. The structure also has an electric heating element which has a radiation end 2a of said thin film waveguide 2 for radiating outwardly a light beam P3 converted from the light beam P2 Bragg-diffracted by said SAW, and has a heating electrode 5 to be heated using a DC voltage input on the top surface of an edge near the radiation end of the thin film optical waveguide 2. This light beam deflector controls a high-frequency oscillator 6 which drives said IDT 3, which deflects the light beam P2 Bragg-diffracted by SAW within the plane of the light film optical waveguide 2 by changing the oscillation frequency of IDT 3. On the other hand, the light beam P3 radiated from said radiation end 2a by controlling the voltage of a DC power supply 7 to be applied to said heating electrode 5 and by changing the temperature of heat from the electrode can be deflected in a direction perpendicular to the surface of the thin film optical waveguide 2 according to the present invention.

Substrate 1 consists of piezoelectric LiNbO$_3$ single crystal, Titanium (Ti) is thermally diffused on the surface of this crystal, and an optical waveguide 2 with a refractive index of about 2.2, which is about 0.003 to 0.005 higher than that of the substrate 1, is formed on the surface.

Said heating electrode 5 is formed by evaporating a nickel chromium alloy on said thin film optical waveguide 2. Also, said IDT 3 is formed by the liftoff process on the substrate 1 forming the thin film optical waveguide 2.

Figure 2:
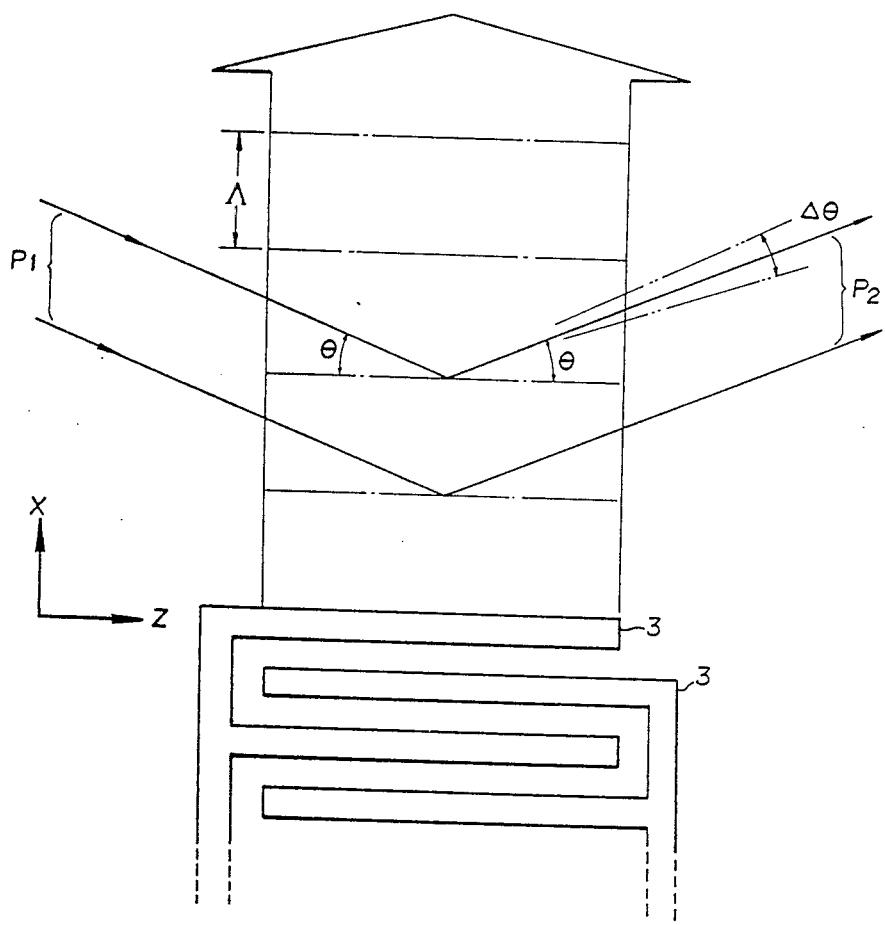
FIG. 2 is a schematic drawing describing the Bragg diffraction phenomenon of the light beam by means of SAW (Surface Acoustic Wave).

Now, operation of the two-dimensional light beam deflector having the configuration as stated above will be explained hereinafter. If said IDT 3 is driven with a certain frequency f, then a SAW with a wavelength $\Lambda$ is generated on the thin film optical waveguide 2 as illustrated in FIG. 2. By means of this SAW, a periodic change in the refractive index with a pitch $\Lambda$ is created in the thin film optical waveguide 2. The wave of this change in the refractive index acts as a diffraction grating, and the light beam P1 with the wavelength $\lambda$ entered with an angle of incidence $\theta$ with respect to the wave surface is reflected by the wave surface as long as the following formula is satisfied, and is converted to a Bragg-diffracted light beam P2:

$$\theta = \arcsin n \, (\lambda/2\Lambda)$$

Figure 3:
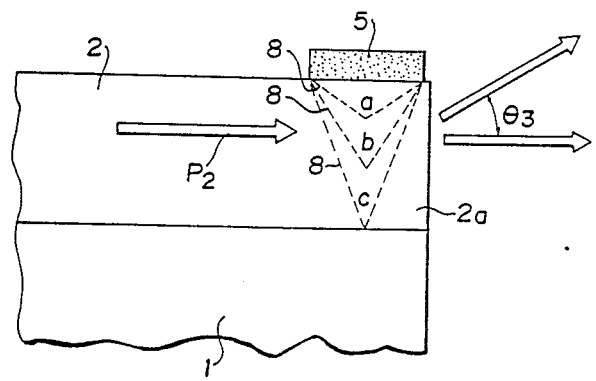
FIG. 3 is an enlarged schematic drawing of the light beam radiation end in the first embodiment of the present invention.

In this case, since the propagation vector of SAW has not only a component in X direction of FIG. 2 but also another component in Z direction, if the driving frequency f of the IDT 3 is changed to f $\pm \Delta$f within a certain range, then the progressing direction of Bragg-diffracted light beam P2 begins to change within the range of $\Delta\theta$ in the plane of the thin film optical waveguide 2. That is, by continuously varying within a certain range the oscillation frequency of the high frequency oscillator 6, the progressing direction of the light beam P2 can be continuously changed. Also, the substrate 1 consisting of a LiNbO$_3$ single crystal is a crystal whose refractive index varies depending upon its temperature. Therefore, if a proper voltage is applied from the DC power supply 7 to the heating electrode 5 and the electrode is heated, then the heat is transferred from the side of the thin film optical waveguide 2 to the substrate 2, and the refractive index of the thin film optical waveguide 2 is increased by means of the heat. Since the degree of increase of this refractive index becomes larger as the heating temperature increases, the refractive index becomes higher as the location becomes closer to the heating element 5. That is, as shown in FIG. 3, it can be considered that a virtual prism 8 is formed near the radiation end 2a of the thin film optical waveguide 2. Therefore, the light beam P2 deflected by SAW is refracted by the virtual prism 8, radiated and then deflected to the directions perpendicular to the plane of the thin film optical waveguide 2.

Then, the refractive index of said radiation end 2a can be varied by changing the heating value of the heating electrode 5 by varying the voltage of DC power supply 7 to be supplied to said heating electrode 5. That is, as shown in FIG. 3, as the heating value of the heating electrode 5 increases, the refractive index of the virtual prism 8 increases from a to b and to c, thereby resulting in an increase in a light radiation angle $\theta_3$. Thus, by properly controlling high frequency voltage to be applied to IDT 3 and the heating value of the heating electrode 5 as described above, the deflecting direction of the guided light beam in two dimensions can be freely changed.

According to the two-dimensional light beam deflector embodying the present invention as described above, the light beam can be two-dimensionally deflected to in a direction parallel to and perpendicular to its thin film optical waveguide, and also a compact deflector can be easily formed by using a solid state component, so that the two-dimensional light beam deflector embodying the present invention can be applied to those equipment requiring two-dimensional scanning such as a two-dimensional laser scanner, by which high reliability, miniturization and simplification can be realized.

Figure 4:
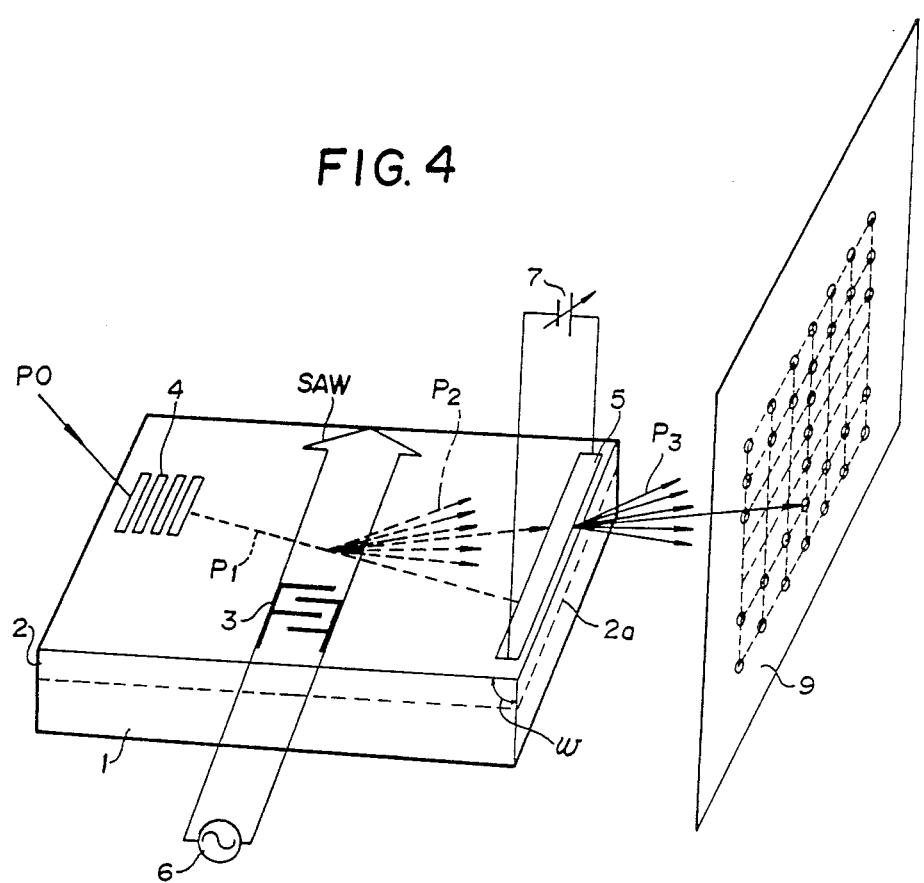
FIG. 4 is a perspective showing the overall construction of the second embodiment of the light beam deflector of the present invention.

By referring to FIG. 4 showing the second embodiment of the present invention, the description will be made hereinafter for the second embodiment, but only the portions differing from the first embodiment will be mainly explained instead of duplicating the description of the basic configuration and its effect common to both of the embodiments. Also, the portions the same as those of the first embodiment will be designated with the same symbols and codes as used for the first embodiment.

One of the features of the second embodiment of the present invention is that said radiation end 2a is formed as a slope with an acute angle w with the plane of the thin film optical waveguide 2, while the radiation end of the first embodiment is formed on a plane perpendicular to the top surface of the thin film optical waveguide 2.

Now, the operation of the two-dimensional light beam deflector with the configuration as stated above will be explained hereinafter.

When IDT 3 is driven with a certain frequency f, the surface acoustic wave (SAW) is generated on the thin film optical waveguide 2 as shown in FIG. 2. If the driving frequency f of IDT 3 is varied within a certain range, the progressing direction of Bragg-diffracted light beam P2 changes within the range of $\Delta\theta$ in the plane of the thin film optical waveguide 2 as shown in FIG. 2.

Figure 6:
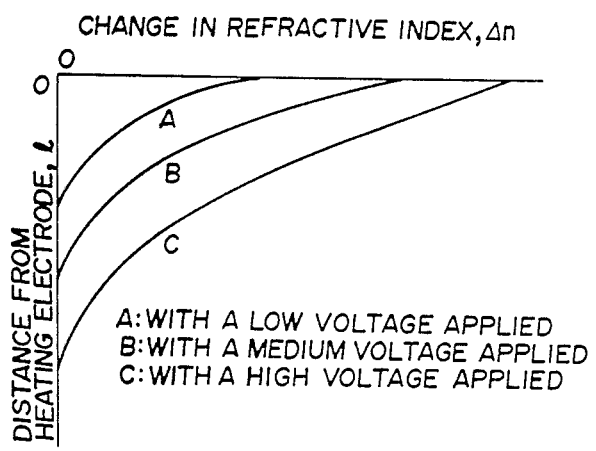
FIG. 6 is a graph showing the relation between the distance l from a heating electrode and the change in refractive index $\Delta n$ due to the heat from the heating electrode for obtaining said thermo-optic effect in the second embodiment stated above.
Figure 5:
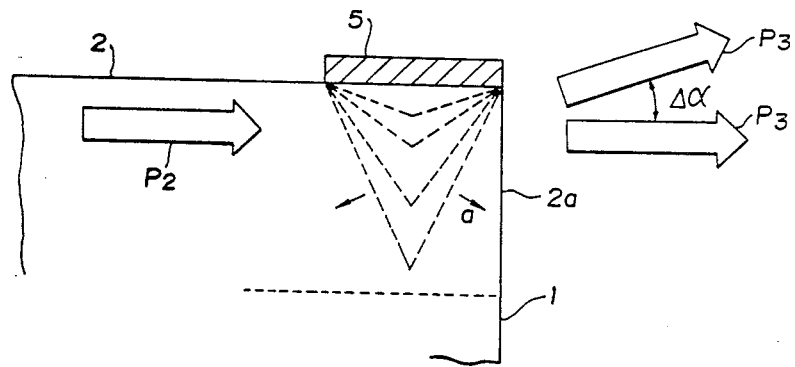
FIG. 5 is a schematic drawing describing the deflection of a light beam due to the thermo-optic effect in the thin film optical waveguide in said second embodiment.

On the other hand, when a proper voltage from the DC power supply 7 is applied to the heating electrode 5 and the electrode is heated, the heat is transferred from the side of the thin film optical waveguide 2 and the refractive index of the thin film optical waveguide increases by the heat as the case of the first embodiment. At that time, since the refractive index changes more as the temperature rise becomes larger, the refractive index will increase as the location becomes closer to the heating electrode 5. FIG. 6 shows the relation between the distance l from the heating electrode 5 and the change in refractive index $\Delta n$ of the thin film optical waveguide 2, in which the heating temperature controlled by the voltage applied to the heating electrode 5 is indicated as a parameter of A, B and C. As shown in this figure, the change in refractive index $\Delta n$ of the thin film optical waveguide 2 will increase as the heating temperature of the heating electrode 5 becomes larger. That is, as shown in FIG. 5 indicating a partial longitudinal section directly below the heating electrode 5, a graded increase in the refractive index occurs as shown by dotted lines in the portion of the waveguide 2 directly below the heating electrode 5, and the refractive index there changes equivalently as the refractive index changes in a virtual prism placed in the optical waveguide 2 as stated above. As the progressing direction of a light beam is generally changed by a prism, the light beam P2 is polarized upward when it passes this portion and is radiated as light beam P3 from the radiation end 2a by the action of the virtual prism due to an increase in said refractive index near the radiation end 2a of the optical waveguide 2 after applying a voltage to the heating electrode 5. At that time, the polarization angle $\Delta \alpha$ of the light beam P3 with a rectilinear light beam parallel to the plane of the thin film optical waveguide 2 varies in response to the degree of change in the refractive index of the optical waveguide 2 acting as an equivalent prism, that is, the magnitude of the heating temperature by the heating electrode 5.

As stated above, by combining the control of IDT 3 by the high frequency oscillator 6 with the control by the DC power supply 7, the progressing direction of the light beam P3 radiated from the radiation end 2a can be two-dimensionally controlled as desired as indicated by dots on the screen 9.

Figure 7:
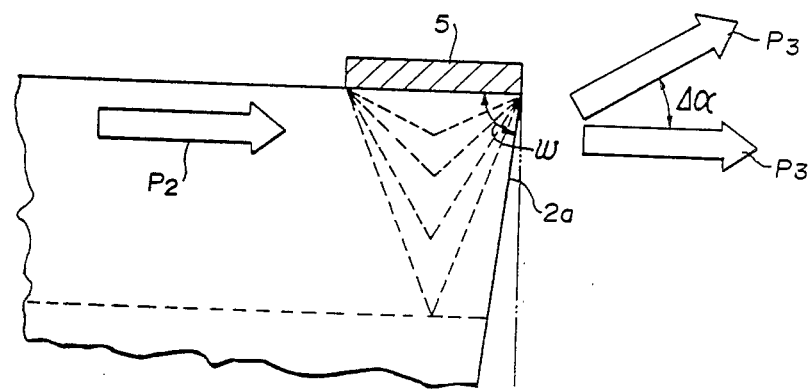
FIG. 7 is a schematic drawing showing the subject of comparison of the present invention when the radiation end is formed normal to the top surface of the thin film optical waveguide.

If the plane of the thin film optical waveguide 2 is perpendicular to the direction end 2a, then the thermal diffusion in the lateral direction shown by arrow a of FIG. 5 from the heating electrode 5 to the optical waveguide 2 is relatively great and thus a steep temperature gradient cannot be made in the vertical direction. On the other hand, in the second embodiment, the radiation end 2a has a slope with an acute angle w with the top plane of the thin film waveguide 2 as shown in FIG. 7 so that the thermal diffusion in the lateral direction becomes extremely small and, because of this, a steep temperature gradient in the vertical direction can be realized directly below the heating electrode 5 even if the voltage applied to the electrode 5 is relatively low. If the temperature gradient directly below the electrode 5 can be easily increased, the deflection angle of the light beam P3 in the vertical direction due to the effect of said equivalent prism may be increased, and also high sensitivity can be obtained since the deflection angle of the light beam P3 can be considerably varied by slightly changing the voltage applied to the electrode 5. Also, the angle of the light beam polarized by the effect of said equivalent prism with the plane of the radiation end becomes larger in the case of FIG. 7 compared to the case of FIG. 5. Because of this, a further amplified deflection angle occurs to the light beam P3 by Snell's law, from which a two-dimensional light beam deflector with a large deflection range can be realized.

Figure 8:
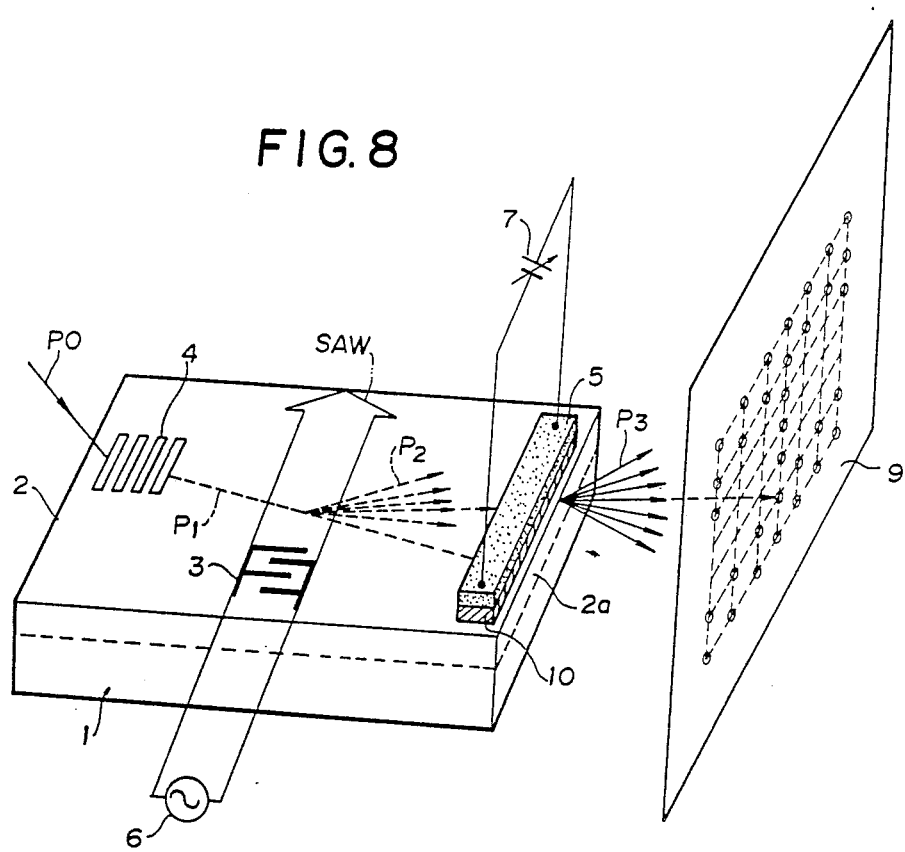
FIG. 8 is a perspective showing the overall construction of the third embodiment of the light beam deflector of the present invention.

By referring to FIG. 8 showing the third embodiment of the present invention, the description will be made hereinafter for the third embodiment, but only the portions differing from the embodiments previously explained will be mainly described instead of duplicating the description of the basic configuration and its effect common to these embodiments. Also, the portions the same as those of the embodiments previously explained will be designated with the same symbols and codes as used previously, and the description for them will be omitted.

One of the features of the third embodiment is that heating electrode 5 is not directly formed on the thin film optical waveguide 2. Instead, different from the first two embodiments, a dielectric thin film 10 with a refractive index smaller than that of the optical waveguide is provided as an intermediate layer between the optical waveguide 2 and the heating electrode 5. This dielectric thin film 10 is a thin film of silicon dioxide with a refractive index of about 1.45, and this thin film of silicon dioxide is formed by the thermal cracking of ordinary silane.

Figure 9:
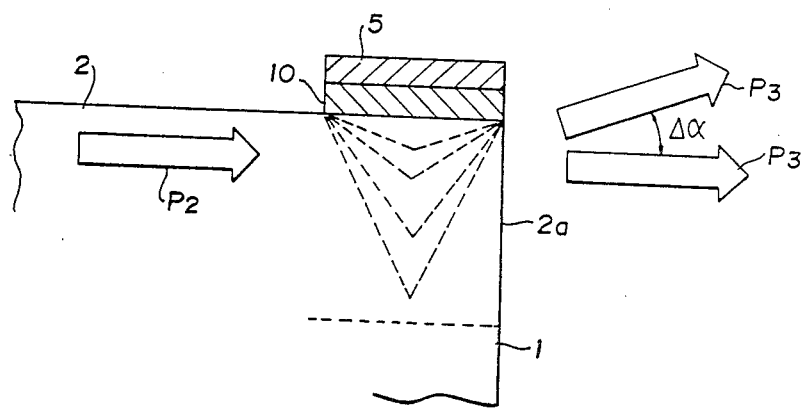
FIG. 9 is a schematic drawing describing the deflection of a light beam due to the thermo-optic effect in the thin film optical waveguide of said third embodiment.

When a proper voltage is applied from DC power supply 7 to the heating electrode 5 to heat the electrode, then the heat is transferred through the dielectric thin film 10 to the substrate 1 from the side of the thin film optical waveguide 2, and the refractive index of the thin film optical waveguide 2 is increased by the heat. As a result, the change in the refractive index $\Delta n$ of the thin film optical waveguide 2 increases as the location becomes closer to the heating electrode 5 and also as the heating temperature of the heating electrode 5 becomes higher as shown in FIG. 6 for the previously described embodiment. That is, as shown in FIG. 9 indicating the partial longitudinal section directly below the heating electrode 5, a graded increase in the refractive index occurs as indicated with dotted lines in the portion of optical waveguide 2 directly below the heating electrode 5.

However, when the heating electrode 5 is formed directly above the optical waveguide 2, the light beam P2 passing through the optical waveguide 2 directly below the electrode 5 is considerably absorbed by the heating electrode 5, resulting in a large propagation loss in this portion. On the other hand, when the dielectric thin film 10 with a small refractive index is provided between the optical waveguide 2 and the electrode 5 as in the case of this embodiment, the effect of the optical waveguide 2 as a layer for closing the light beam is not lost even at the portion directly below the electrode, and the light beam passing through this portion is not subjected to the absorption by the heating electrode. In consequence, a light beam deflector with a high efficiency having less light attenuation, that is, less propagation loss, can be realized.

Figure 10:
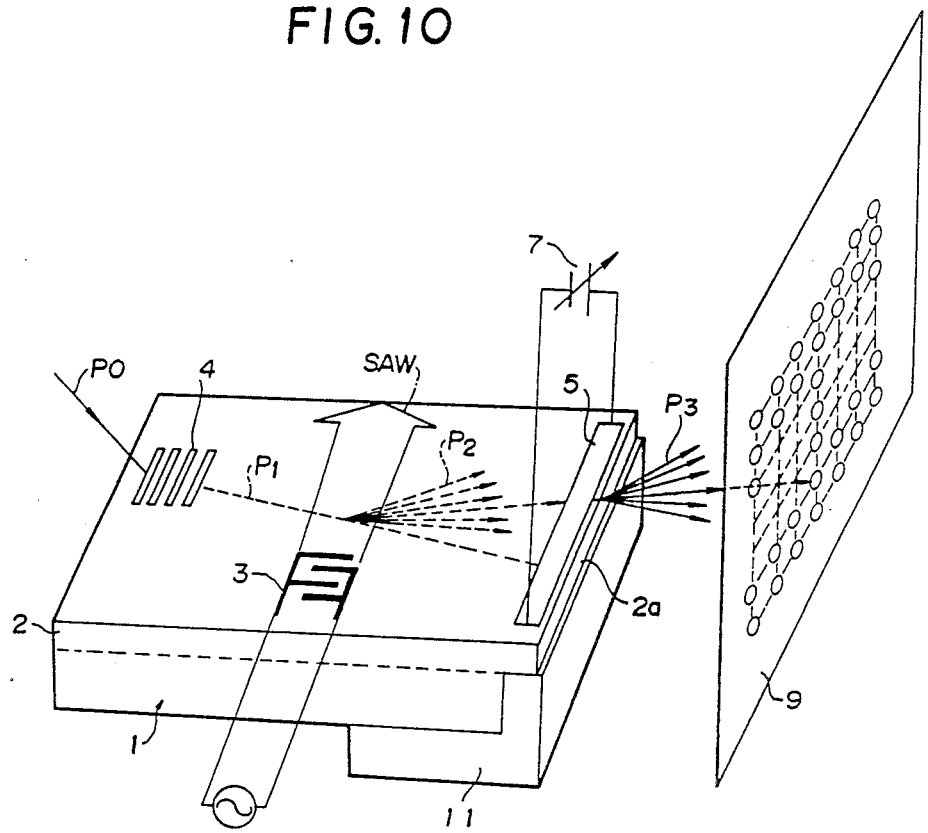
FIG. 10 is a perspective showing the overall construction of the fourth embodiment of the light beam deflector of the present invention.

The fourth embodiment of the present invention is shown in FIG. 10, of which no description will be made for the basic configuration and effect hereinafter and the same symbols and codes used previously for the first to third embodiments will be used by omitting the description for them.

Figure 11:
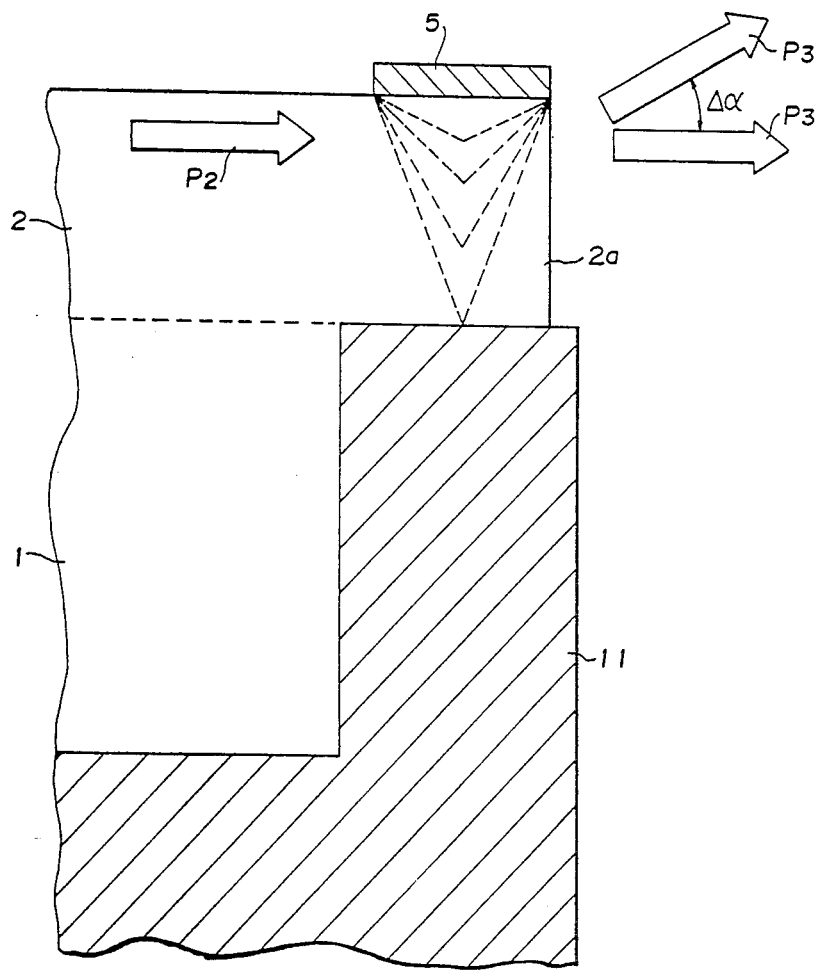
FIG. 11 is a schematic drawing describing the deflection of the light beam due to the thermo-optic effect of the thin film optical waveguide of said fourth embodiment.

As shown in FIG. 10 and in an enlarged partial section of FIG. 11, one of the features of the fourth embodiment of the present invention is that a portion of the substrate 1 below the radiation end 2a, that is, a portion opposite to and below the heating electrode 5 is cut off by etching or grinding, and the bottom of the thin film optical waveguide 2 adjacent to this cut-off portion is exposed. A heat sink 11 made of a material with a high thermal conductivity is filled in this portion in such a manner that a portion of the thin film optical waveguide 2 will be sandwiched between the heating electrode 5 and the heat sink 11. That is, the top of the thin film optical waveguide 2 is heated by the heating electrode 5 and the bottom of the waveguide is cooled off due to the heat radiation by means of the heat sink 11. Also, it is desired to form fins or other means for the heat sink 11 to improve the radiating and cooling effects.

IDT 3 is driven with a certain frequency f to generate SAW, and then a proper voltage is applied from the DC power supply 7. Then, as previously described for the other embodiments, the light beam P3 from the radiation end 2a can be two-dimensionally controlled as desired.

In this embodiment, a portion of the thin film optical waveguide 2 near the radiation end 2a is heated from its top by the heating electrode 5 and, at the same time, the bottom of this portion is cooled off by the heat radiation through the heat sink 11, so that the temperature gradient in this portion can be greatly increased. If the temparature gradient directly below the electrode 5 can be easily increased, then the deflection angle of the light beam P3 in the vertical direction can be increased by the effect of the equivalent prism described previously and also the deflection angle of the light beam P3 can be greatly varied by slightly changing the voltage applied to the electrode 5, so that two-dimensional light beam deflection with a large deflection range can be realized.

Figure 12:
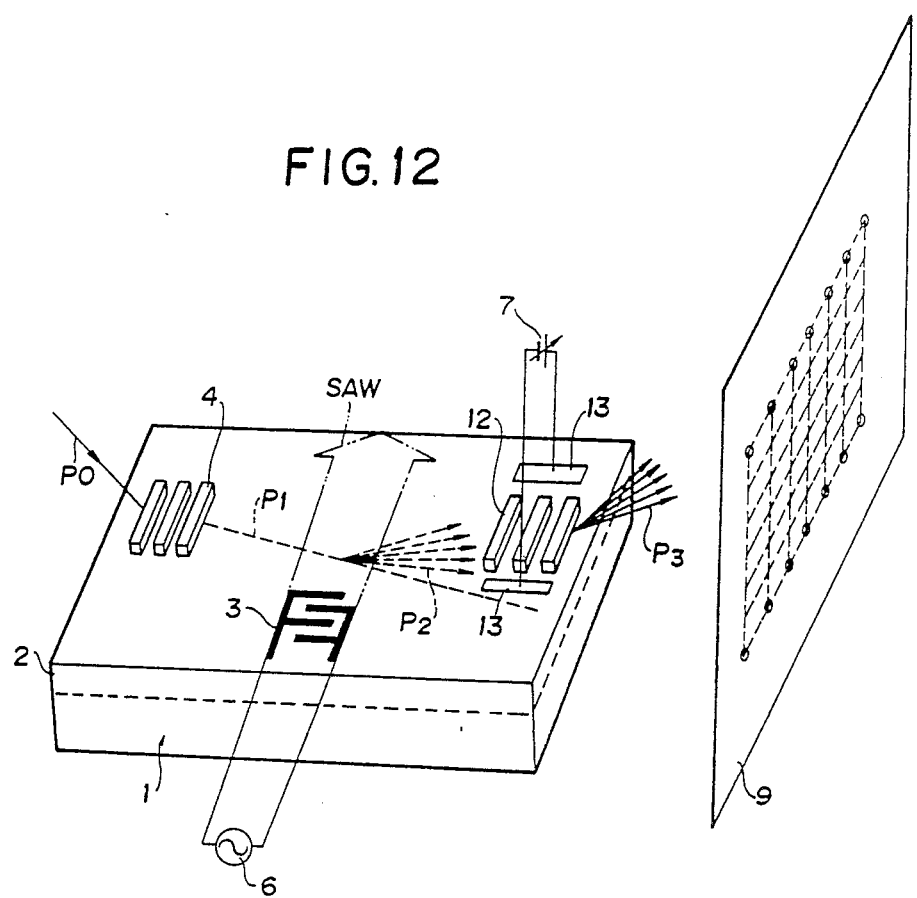
FIG. 12 is a perspective showing the overall construction of the fifth embodiment of the light beam deflector of the present invention.

FIG. 12 shows the fifth embodiment of the present invention, of which no description will be made for the basic configuration and effect herinafter, and the same symbols and codes used previously for the other embodiments will be used without additionally describing them.

Figure 13:
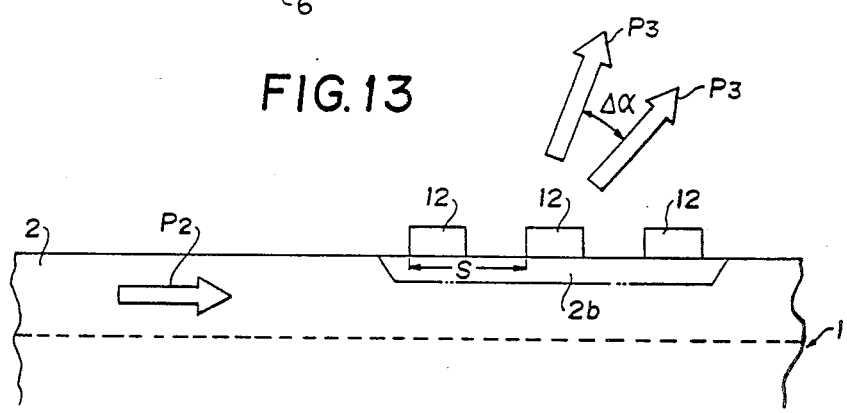
FIG. 13 is a schematic drawing describing the deflection of light beam due to a change in refractive index at the portion formed with radiation grating on the thin film optical waveguide of said fifth embodiment.

As shown in FIG. 12 and in a partial enlarged section of FIG. 13, according to the featured configuration of the fifth embodiment of the present invention, the radiation grating 12 is formed on the top of the thin film optical waveguide 2 in order to radiate outwardly the light beam P2 Bragg-diffracted by the SAW as the light beam P3, and a pair of electrodes 13, 13 are located at both the sides of the radiation grating 12 so as to vary the refractive index of the thin film optical waveguide 2 by means of said pair of electrodes 13, 13 at the portion where the radiation grating 12 has been formed.

Then, according to the configuration of this embodiment, the high frequency oscillator 6 for driving the IDT 3 is controlled so as to vary the oscillation frequency of IDT 3, thereby the light beam P2 Bragg-diffracted by the SAW is deflected within the plane of the thin film optical waveguide 2, and the refractive index is varied due to the electro-optic effect on the portion of the thin film optical waveguide 2, on which the radiation grating 12 is formed, by controlling the output voltage of the DC power supply 7 which supplies a voltage between said pair of electrode 12, 12 so as to deflect the light beam P3 radiated from the radiation grating 12 in a direction perpendicular to the plane of the thin film optical waveguide 2.

Both the incidence grating 4 and radiation grating 12 are formed with silicon dioxide or other by such as CVD method in the predetermined pattern at a predetermined location on the thin film optical waveguide 2.

Also, the electrode 13 is formed by evaporation with an electrode metal such as aluminum at a predetermined location on the thin film optical waveguide 2.

Now, the operation of the light beam deflector of the embodiment of the present invention will be described hereinafter. As for each embodiment described before, the progressing direction of the light beam P2 can be continuously varied in this deflector of the fifth embodiment by continuously changing within a certain range the oscillation frequency of the high frequency oscillator 6.

If a DC voltage is applied between the electrodes 13, 13, then the refractive index varies at the crystal portion between the electrodes 13, 13 because of the electrooptic effect of the substrate made of a single crystal of LiNbO$_3$. This variation in the refractive index occurs in the surface portion of the thin film optical waveguide 2 on which the radiation grating 12 has been formed. As shown in the partial enlarged section of FIG. 13, the variation in the refractive index in the surface portion 2b of the thin film optical waveguide 2 on which the radiation grating 12 has been formed will give an effect substantially equal to a change in period S of the grating 12 to the light beam P3 radiated from the radiation grating 12 and, because of this, the radiation angle of the light beam P3 radiated from the radiation grating 12 varies due to the change in the refractive index in said surface portion 2b. This change in the radiation angle occurs depending upon the degree of variation in the refractive index in the surface portion 2b of the thin film optical waveguide 2. And the degree of the refractive index varies in response to DC voltage applied between the electrode 13, 13. Thus, the radiation angle of the output light beam P3 can be varied within a certain range $\Delta d$ by changing within a certain range the output voltage from DC power supply 7. That is, if the voltage of DC power supply 7 to be applied to the electrode 13, 13 is changed, then the light beam P3 radiated from the radiation grating 12 can be deflected in a direction perpendicular to the plane of the thin film optical waveguide 2.

As described above, since the light beam deflector of the fifth embodiment can be produced by optical integrated circuit technology, compact light beam deflectors with uniform characteristics can be mass-produced at a low cost.

Figure 14:
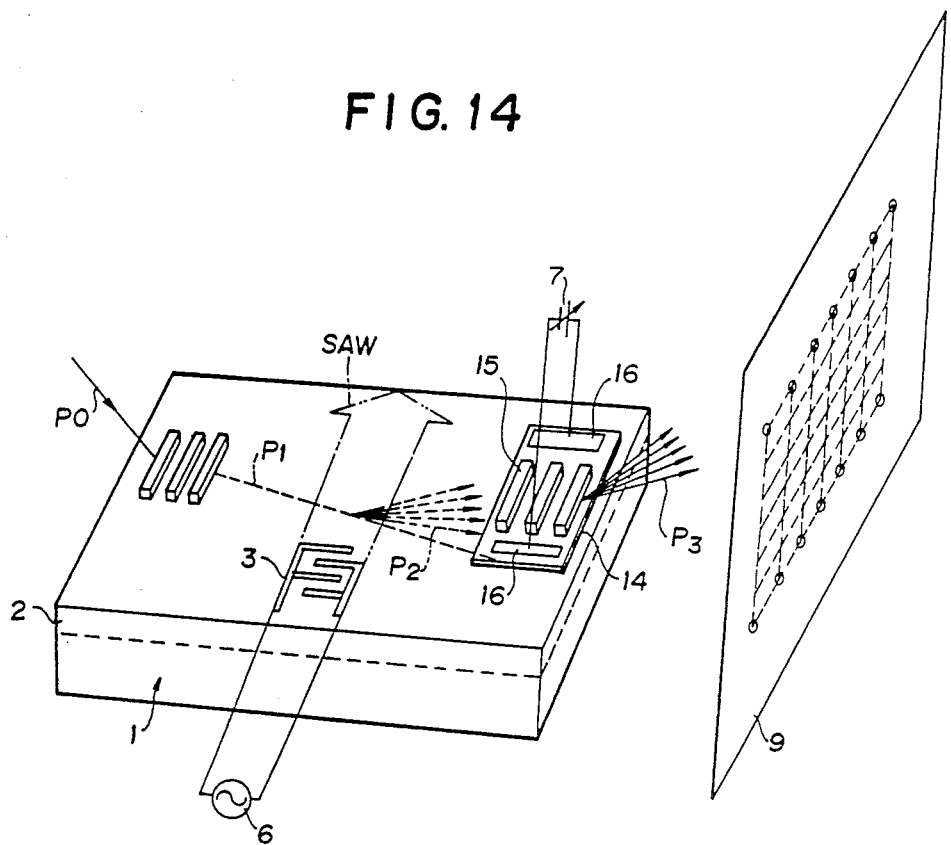
FIG. 14 is a perspective showing the overall construction of the sixth embodiment of the light beam deflector of the present invention.

FIG. 14 shows the sixth embodiment of the present invention, of which no description will be made hereinafter for the basic configuration and effect, and the same symbols and codes will be used as before for the same portions without specially describing them.

Figure 15:
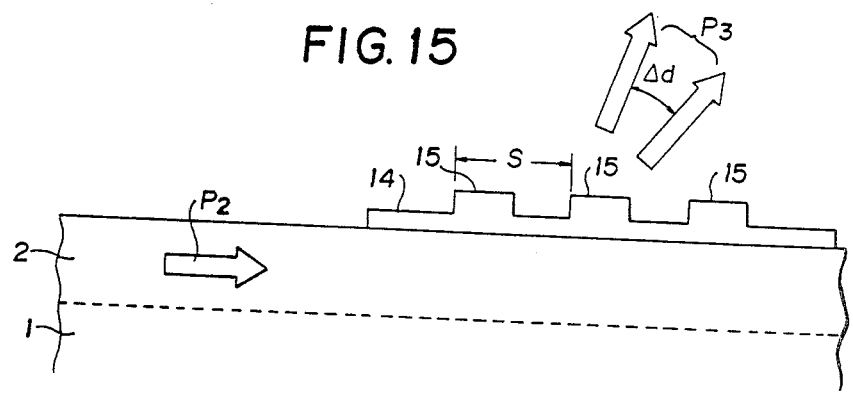
FIG. 15 is a schematic drawing describing the deflection of light beam due to a change in refractive index of the top thin film in said sixth embodiment of the present invention.

As indicated in FIG. 14 and in an enlarged section of FIG. 15, the features of the sixth embodiment are that an upper thin film 14 is formed on the top surface of the thin film optical waveguide 2 and the radiation grating 15 is formed over the upper thin film in order to radiate the light beam P2 Bragg-diffracted by SAW outwardly as light beam P3, and a pair of electrodes 16, 16 are formed on the upper thin film 14 at both the sides of the radiation grating 15 as a means for varying the refractive index of the upper thin film 14.

Said upper thin film 14 is formed by evaporating SnO$_2$ at a predetermined location on the top surface of the thin film optical waveguide 2. Said radiation grating 15 is formed by producing corrugations of a predetermined pattern by etching at a predtermined location on the upper thin film 14 made of SnO$_2$. That is, according to this embodiment, the radiation grating 15 is formed together with and on the top of the upper thin film 14.

Now, the operation of the light beam deflector of the sixth embodiment will be described hereinafter.

As for each embodiment described previously, the progressing direction of the light beam P2 can be continuously varied also in this embodiment by continuously changing the oscillation frequency of the high frequency oscillator 6 within a certain range.

Also, SnO$_2$ forming the upper thin film 14 is an electric heating element, which is heated when a current is applied through it, and is also a substance having the thermo-optic effect by which the refractive index of the sustance varies depending upon the temperature.

Therefore, if a voltage is applied between said electrodes 16, 16, a current flows through the upper thin film 14 made of SnO₂ causing the upper thin film to be heated, abnd then the refractive index of the upper thin film 14 varies by the heat. In the partial enlarged section of FIG. 15, the variation in the refractive index of the upper thin film 14 gives the effect substantially the same as the variation in the period S of the grating to the light beam P3 radiated from the radiation grating 15 and, because of this, the radiation angle of the light beam P3 radiated from the radiation grating 15 is varied due to the variation in the refractive index of the upper thin film 14. This variation in the radiation angle varies depending upon the degree of the variation in the refractive index of the upper thin film 14. The degree of the refractive index varies in response to the heating temperature of the upper thin film 14 by the electrodes 16, 16. Therefore, the radiation angle of the output light beam P3 can be changed within a certain range of Δd by changing the output voltage from the DC power supply 7 within a certain range. That is, the light beam P3 radiated from the radiation grating 15 can be delfected in a direction perpendicular to the plane of the thin film optical waveguide 2 by changing the voltage of the DC power supply 7 to be applied to the electrodes 16, 16.

Though the thermo-optic effect of the upper thin film 14 is utilized in this embodiment as a means of variation in the refractive index of the upper thin film 14, the present invention is not restricted by this effect and, if the upper thin film is formed with a material having the electro-optic effect, the refractive index can be varied by the electro-optic effect.

Also, though the radiation grating of this embodiment is formed on the top of the upper thin film by using the same substance for both the grating and upper thin film, the present invention is not restricted by this and, thus, the grating may be formed on the top of the upper thin film with a substance different from that of the upper thin film. Also, the shape of the grating is not restricted to the rectangular shape indicated in the figure, and it may be even the sinusoidal-wave shape or sawtooth-wave shape.

As described hereinbefore, the light beam deflector of this embodiment of the present invention can be produced by optical integrated circuit technology, and thus compact light beam deflectors with uniform characteristics can be mass-produced at a low cost.

As many apparently widely different embodiments of this invention may be made without departing from the spirit and scope thereof, it is to be understood that the invention is not limited to the specific embodiments thereof except as defined in the appended claims.

What is claimed is:

1. A two dimensional light beam deflector responsive to first and second electrical signals, comprising:
   a thin film substrate forming an optical waveguide which conducts a light beam in parallel to a surface of the substrate;
   means for propagating an incident light beam across said substrate;
   first means on said substrate, connected to receive said first electrical signal, for deflecting the propagating light beam in a first selected direction parallel to a plane of said thin film optical waveguide, said first means selecting said first direction in response to said first signal; and
   second means formed in combination on the same thin film optical waveguide, connected to receive said second electrical signal, for deflecting the light beam, once deflected by said first means, in a second selected direction perpendicular to the plane of said thin film optical waveguide and perpendicular to said first direction, said second means selecting said second direction in response to said second signal and comprising a heating means.

2. The two-dimensional light beam deflector of claim 1, said first deflection means comprising an interdigital Transducer (IDT) for propagating a surface acoustic wave (SAW) across said thin film optical waveguide and a grating coupler for propagating the light beam Bragg-diffracted by said SAW to said thin film optical waveguide, said light beam Bragg-diffracted deflection being varied by changing the oscillation frequency of said IDT in the plane of said thin film optical waveguide.

3. The two-dimensional light beam deflector of claim 1, said second deflection means being an electric heating element, said heating element being applied with a voltage in order to vary the refractive index of a radiation end of said thin film optical waveguide for deflecting said light beam in a direction perpendicular to the plane of said thin film optical waveguide.

4. The two-dimensional light beam deflector of claim 1, said second deflection means including means defining a surface having a slope with an acute angle meeting with a top surface of said thin film optical waveguide on the face of a radiation end of said thin film optical waveguide for outwardly radiating a light beam Bragg-diffracted by the SAW and having an electric heating element near and at an edge portion of said thin film optical waveguide, said radiation end deflecting a light beam in a direction perpendicular to the plane of said thin film optical waveguide by varying the refractive index of said thin film optical waveguide near said radiation end by changing the heating temperature of said electric heating element.

5. The two-dimensional light beam deflector of claim 1, said second deflection means comprising a radiation end of said thin film optical waveguide for outwardly radiating a light beam Bragg-diffracted by SAW, a dielectric thin film, with a refractive index lower than that of said optical waveguide, formed at an edge portion of and on the top of said thin film optical waveguide near the radiation end, and an electric heating element formed on said dielectric thin film, the refractive index of said thin film waveguide near said radiation end being varied by changing the heating temperature of said electric heating element so as to deflect said light beam radiated from said radiation end in a direction perpendicular to the plane of said thin film optical waveguide.

6. The two-dimensional light beam deflector of claim 1, said second deflection means comprising a radiation end of said thin film optical waveguide for radiating outwardly the Bragg-diffracted light beam, an electric heating element disposed on an edge portion on the top of said thin film optical waveguide near said radiation end, and a heat sink disposed below said thin film optical waveguide below said electric heating element, the refractive index of a portion of said thin film optical waveguide in proximity to said radiation end being varied by changing the heating temperature of said electric heating element so as to deflect the light beam radiated from said radiation end in a direction perpendicular to the plane of said thin film optical waveguide.

7. The two-dimensional light beam deflector of claim 1, said second deflection means comprising a radiation grating formed on said thin film optical waveguide and a pair of electrodes formed on said thin film optical waveguide, the refractive index of a portion formed with said radiation grating being varied by applying a voltage to said electrodes so as to deflect a light beam radiation grating in a direction perpendicular to the plane of said thin film optical waveguide.

8. The two-dimensional light beam deflector of claim 1, said second deflection means comprising a radiation grating formed on an upper thin film formed on and optically coupled to said thin film optical waveguide, and a pair of electrodes formed on said upper thin film at first and second sides of said radiation grating, the refractive index of said upper thin film being varied by applying a voltage to said electrodes so as to deflect a light beam radiated from said radiation grating in a direction perpendicular to the plane of said thin film optical waveguide.

9. The two-dimensional light beam deflector of claim 1, said thin film optical waveguide being formed by the thermal diffusion of titanium over a substrate and having a refractive index higher than that of said substrate.

10. The two-dimensional light beam deflector of claim 3, said electric heating element comprising a nickel chromium alloy.

11. The two-dimensional light beam deflector of claim 5, said dielectric thin film comprising a thin film of silicon dioxide with a refractive index of about 1.45.

12. The two-dimensional light beam deflector of claim 7, said one pair of electrodes comprising aluminum.

13. The two-dimensional light beam deflector of claim 8, said upper thin film comprising $SnO_2$.

14. The two-dimensional light beam deflector of claim 7, said radiation grating being formed with silicon dioxide on said thin film optical waveguide by CVD method.

15. The two-dimensional light beam deflector of claim 8, said radiation grating being formed monolithically with said upper thin film.

16. An apparatus as in claim 1 wherein:
said propagating means propagates said incident light across said substrate over a first path P1;
said first deflecting means deflects said incident light within the plane of said waveguide by a first angle $\Delta\theta$;
said apparatus further includes means optically coupled to said first deflecting means for selecting $\Delta\theta$ from a preselected range; and
said second deflecting means deflects said light beam, first deflected by any angle $\Delta\theta$ within said range by said first deflecting means, by a second angle independent of said first angle.

17. An apparatus as in claim 1 wherein said:
said apparatus further includes means defining a radiation end of said waveguide; and
said second deflecting means covers substantially all of said radiation end.

18. A method of deflecting a light beam comprising the steps of:
(1) propagating an incident light beam along a first path through a planar optical waveguide formed on a substrate, said first path parallel to a surface of said substrate;
(2) applying a first electrical signal to a first light deflecting means disposed on said substrate;
(3) deflecting said propagating beam in a first direction parallel to said surface, and by a first angle, in response to said first signal, so that said propagating beam follows a second path within said planar optical waveguide;
(4) applying a second electrical signal to a second light deflecting means disposed on said substrate; and
(5) deflecting said beam travelling along said second path in response to said second signal in a second direction perpendicular to said surface to a third path having at least one direction component not within the plane of said waveguide said deflecting occurring by applying heat to said substrate.

19. A method as in claim 18 wherein:
said deflecting step (3) deflects said propagating beam by a first angle $\Delta\theta$ selected from a predetermined range of angles in response to said first signal; an
said deflecting step (5) deflects said beam by said second angle independent of said first angle after said beam has been deflected by any angle $\Delta\theta$ within said range by said deflecting step (3).

20. A method as in claim 18 wherein said direction component is perpendicular to the plane of the waveguide.

* * * * *